United States Patent
Minhas et al.

(10) Patent No.: US 7,837,880 B2
(45) Date of Patent: Nov. 23, 2010

(54) ACID TOLERANT POLYMERIC MEMBRANE AND PROCESS FOR THE RECOVERY OF ACID USING POLYMERIC MEMBRANES

(75) Inventors: Bhupender S. Minhas, Bridgewater, NJ (US); Dennis G. Peiffer, Annandale, NJ (US); David C. Dalrymple, Bloomsbury, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 373 days.

(21) Appl. No.: 11/890,642

(22) Filed: Aug. 7, 2007

(65) Prior Publication Data
US 2007/0272614 A1 Nov. 29, 2007

Related U.S. Application Data

(63) Continuation-in-part of application No. 10/947,019, filed on Sep. 22, 2004, now abandoned, which is a continuation-in-part of application No. 10/773,789, filed on Feb. 6, 2004, now abandoned.

(51) Int. Cl.
*B01D 61/00* (2006.01)
*B01D 63/00* (2006.01)

(52) U.S. Cl. .............. 210/651; 210/650; 210/652; 210/653; 210/500.41; 210/321.76; 210/321.84

(58) Field of Classification Search .................. None
See application file for complete search history.

(56) References Cited

U.S. PATENT DOCUMENTS

| | | | |
|---|---|---|---|
| 2,276,210 A * | 3/1942 | Lane et al. | ............... 210/641 |
| 3,275,575 A * | 9/1966 | Fogle | ....................... 521/27 |
| 3,333,019 A | 7/1967 | Nathan et al. | |
| 3,907,675 A * | 9/1975 | Chapurlat et al. | ........... 210/654 |
| 3,951,815 A * | 4/1976 | Wrasidlo | ............... 210/500.27 |
| 3,963,567 A | 6/1976 | Cole | |
| 4,067,805 A | 1/1978 | Chiang et al. | |
| 4,071,454 A | 1/1978 | Yamamoto et al. | |
| 4,387,024 A * | 6/1983 | Kurihara et al. | ............. 210/490 |

(Continued)

FOREIGN PATENT DOCUMENTS

| | | |
|---|---|---|
| EP | 0307635 | 8/1988 |
| EP | 0352798 B1 | 10/1998 |
| JP | 05-301034 | 11/1993 |
| JP | 07-265864 | 10/1995 |
| JP | 10-132241 | 5/1998 |

(Continued)

OTHER PUBLICATIONS

Jia Zhiqian, Zhu Changging, Zhang Qun, Liu Huijuan, Liu Zhongzhou, Qu Jiuhul, Fu Dianpo; "Comprehensive utilization of acid wastewater from 3,3'-dichlorobenzidine hydrochloride manufacture", J. Chem. Technol. Biotechnol 76: pp. 1085-1090.
William Y. Hsu, Timothy D. Gierke; "Ion Transport and Clustering in Nafion Perfluorinated Membranes," Journal of Membrane Science, 13 (1983) pp. 307-326.

*Primary Examiner*—Krishnan S Menon
(74) *Attorney, Agent, or Firm*—Lawrence E Carter; Bruce M. Bordelon

(57) ABSTRACT

A crosslinked polymeric membrane, such as a crosslinked polyvinyl sulfate membrane or a crosslinked copolymer polyvinyl sulfate and polyvinyl alcohol membrane, is provided. The membrane is suitable for use in an acid environment, and is suitable for recovering acid from a feed mixture comprising acid, hydrocarbons and water.

11 Claims, 7 Drawing Sheets

U.S. PATENT DOCUMENTS

| | | | |
|---|---|---|---|
| 4,767,645 A * | 8/1988 | Linder et al. | 427/386 |
| 4,833,014 A * | 5/1989 | Linder et al. | 428/308.4 |
| 4,911,844 A * | 3/1990 | Linder et al. | 210/638 |
| 5,406,641 A | 4/1995 | Bigley, Jr. et al. | |
| 5,456,839 A * | 10/1995 | Chou | 210/638 |
| 5,565,102 A | 10/1996 | Brandt et al. | |
| 6,183,642 B1 * | 2/2001 | Heijnen et al. | 210/605 |
| 2002/0150729 A1 | 10/2002 | Mueller et al. | |
| 2004/0222157 A1 | 11/2004 | Minhas et al. | |
| 2005/0173345 A1 | 8/2005 | Minhas et al. | |
| 2006/0144792 A1 | 7/2006 | Minhas et al. | |
| 2006/0194258 A1 | 8/2006 | Pirrung et al. | |
| 2007/0075013 A1 * | 4/2007 | Duong et al. | 210/500.36 |

FOREIGN PATENT DOCUMENTS

| | | |
|---|---|---|
| WO | WO 88/05769 | 8/1988 |
| WO | WO 98/43716 | 10/1998 |
| WO | WO 99/50177 | 10/1999 |
| WO | WO 01/89654 A1 | 11/2001 |
| WO | WO 2004/074811 A1 | 9/2004 |

* cited by examiner

Absorbance /     0.2 Micron Gore-Tex Support Material     Res=
File # 1 =     Overlay Y-Zoom

ACID TOLERANT POLYMERIC MEMBRANE AND PROCESS FOR THE RECOVERY OF ACID USING POLYMERIC MEMBRANES

This application is a Continuation-in-Part of U.S. Ser. No. 10/947,019 filed Sep. 22, 2004, now abandoned, which is a Continuation-in-Part of U.S. Ser. No. 10/773,789 filed Feb. 6, 2004, now abandoned.

FIELD OF THE INVENTION

The present invention relates generally to polymeric membranes for separating acid from acid mixtures. More particularly, it relates to particularly adapted polymeric membranes and their use in separating and recovering acids, including sulfuric acid from waste acid mixtures or streams. These streams may comprise acid, and any combination of acid and hydrocarbons and/or water and other "contaminants", using polymeric membranes.

BACKGROUND OF THE INVENTION

Numerous industrial processes use acids in their processing that contaminate the acid with process by-products in waste. These contaminated acids are commonly referred to as "spent acid". Industrial chemical and petroleum processes are prime examples. Many of these processes require costly processing of the process acid to remove impurities. For example, acids are widely used in industrial chemical and petroleum refining applications that require acid "regeneration," which generally means removal of contaminants (including often water) from the process acid to restore the acid to, or near to, its original process specification or requirements. Handling spent acid also raises safety and environmental concerns.

An exemplary acid use to illustrate the present invention is sulfuric acid, which is used in a number of petrochemical and petroleum refining processes. Depending on the use, commercial "fresh" acid is typically supplied in strengths of 70-99.5 wt % sulfuric acid with the remainder typically being water. Many uses generate a waste or spent acid stream containing organic hydrocarbon materials. This spent acid stream is typically reprocessed to remove the organic material. Incineration and reconstitution of the sulfuric acid is conventionally used to remove the organic material.

An exemplary petroleum processing use of sulfuric acid is as a catalyst for alkylation processes. In a typical alkylation process the relatively high purity, concentrated sulfuric acid becomes diluted or contaminated with water and organic hydrocarbon materials commonly referred to as acid soluble oil (ASO). When sufficiently diluted or contaminated, the catalytic activity of the acid degrades. Spent sulfuric acid from the alkylation process can be regenerated but at a considerable cost using existing methods.

Conventional methods for spent acid regeneration involve generally combustion of the spent acid to form sulfur dioxide, conversion of the sulfur dioxide to sulfur trioxide, and absorption of the sulfur trioxide in water. While this technology is widely used to produce high strength acid (>98 wt % $H_2SO_4$), it is capital intensive. Thus, it is usually more economical for low volume users of sulfuric acid to transfer spent sulfuric acid by various means such as rail, truck, ship, or pipeline to a central regeneration facility rather than construct their own facilities for acid regeneration. Freight costs can be a significant part of the total costs for regenerating spent acid.

Sulfuric acid can also be concentrated from about 70 wt % $H_2SO_4$ to about 85 wt % or about 96 wt % sulfuric acid by using evaporation with one or two stages. The evaporation method is highly energy intensive as the acid/water mixture must be heated to a high temperature to vaporize the water. It also requires special materials such as glass lined vessels and tantalum heaters to prevent corrosion. An improved, less expensive method for regenerating spent sulfuric acid is needed.

Accordingly, there is ample need for a separation process to efficiently and effectively remove impurities from process contaminated acids to restore the acid to or near its original process specification. It would also be beneficial if that process could be deployed "in situ" with the process that produced the spent acid.

SUMMARY OF THE INVENTION

In an embodiment, a method is provided for recovering acid from a feed mixture comprising acid, hydrocarbons and water. The method includes processing a feed mixture that comprises from about 70 to about 98 percent by weight acid using a crosslinked polymeric membrane to form a first retentate and a first permeate product. The first retentate contains a substantially greater weight percentage of hydrocarbons than the feed mixture, while the first permeate product contains a greater weight percentage of acid than the feed mixture. The crosslinked polymeric membrane used for the separation is selectively permeable to the acid over the hydrocarbons in the feed mixture. The crosslinked polymeric membrane can be further characterized as having a crosslinking density from about 1.0% to about 25.0%. In an embodiment, the acid recovered from the feed mixture is sulfuric acid. In another embodiment, the crosslinked polymeric membrane is composed of polyvinyl alcohol, polyvinyl sulfate, or a combination thereof. In still another embodiment, the crosslinked polymeric membrane is composed of a polymerized alcohol, an oxoanion modified polymerized alcohol, or a heteropolymer comprising alcohol or oxoanion modified alcohol monomers. In such an embodiment, the crosslinked polymeric membrane can be formed using a substantially anhydrous process. In yet another embodiment, the crosslinked polymeric membrane is composed of polyvinyl pyridine.

In an embodiment, a multi-layer membrane structure for use in acid environments having 70% or more by weight of acid is provided. The multi-layer membrane has a first layer composed of a crosslinked polymeric membrane having a first thickness, the membrane being selectively permeable to acid over hydrocarbons and further characterized as having a crosslink density from about 1.0% to about 25.0%. The second layer of the multi-layer membrane is composed of a fluoropolymer or a cellulosic polymer having a pore size that is less than half of the first thickness. The third layer of the membrane is a structural layer composed of a material with a pore-size of at least 3 µm.

In another embodiment, a multi-layer membrane structure for use in acid environments having 70% or more by weight of acid is provided. The multi-layer membrane has a first layer composed of a crosslinked polymeric membrane. The crosslinked polymeric membrane is composed of a polymerized alcohol, an oxoanion modified polymerized alcohol, or a combination thereof. The crosslinked polymeric membrane has a first thickness and is selectively permeable to acid over hydrocarbons. The crosslinked polymeric membrane can be further characterized as having a crosslink density from about 3.0% to about 15.0%. The second layer of the multi-layer membrane is composed of PTFE or extended PTFE having a thickness of at least 10 microns and having a pore size that is less than half of said first thickness. The third layer of the

DETAILED DESCRIPTION OF THE PREFERRED EMBODIMENTS

Figure 1:
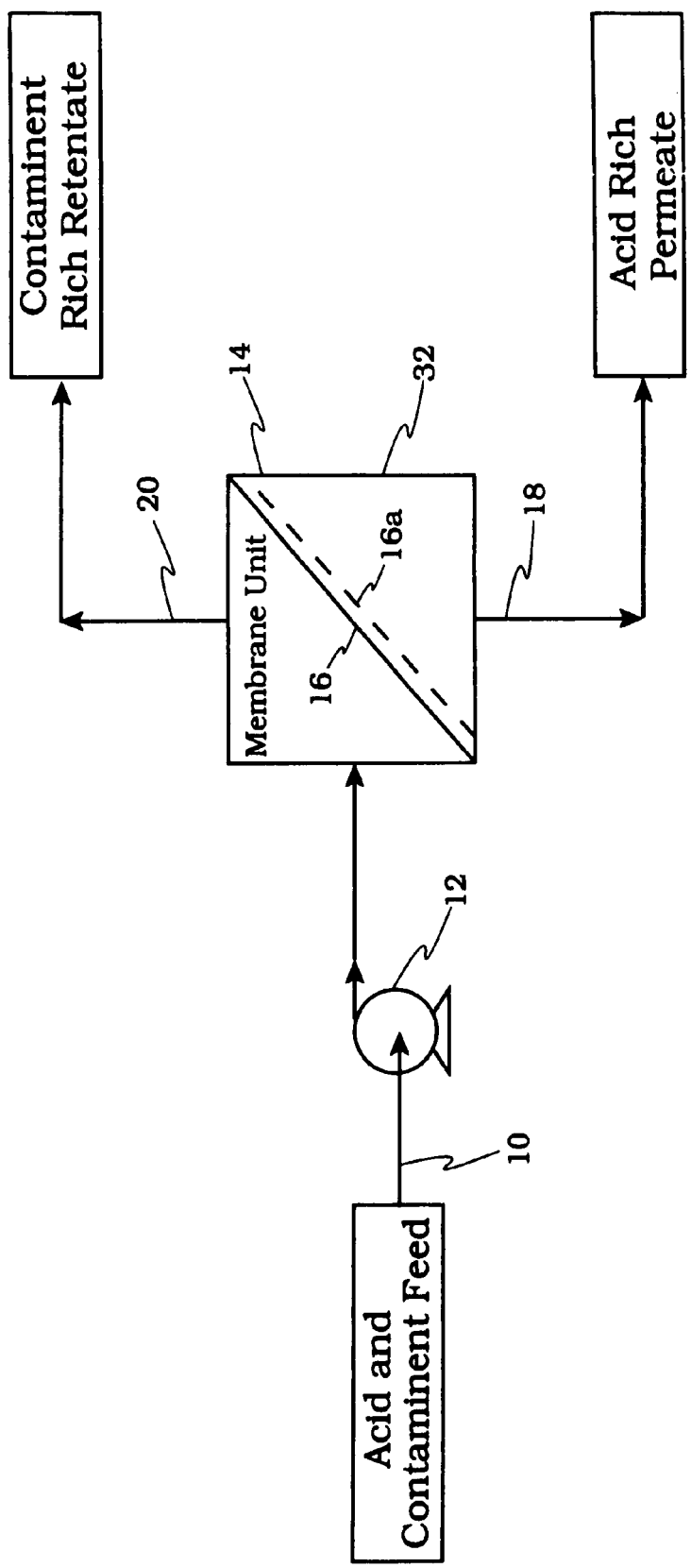
FIGS. 1 to 5 are simplified schematics of different embodiments of the present invention.

This invention relates generally to an improved polymeric membrane and its use in regenerating spent acid. One embodiment of the invention relates to particularly adapted crosslinked polymer membranes that are capable of withstanding an acid environment and the use of such membranes in a method for recovering an acid such as sulfuric acid from a feed mixture comprising acid, hydrocarbons and water. The method comprises processing said mixture using a polymeric membrane to form a first retentate containing a substantially greater concentration of hydrocarbons than the feed mixture and a first permeate product containing a greater concentration of acid than said feed mixture. In another embodiment, the method comprises processing the first permeate product using a second polymeric membrane to form a second retentate containing a substantially greater concentration of acid than the first permeate product and a second permeate product containing a substantially greater concentration of water than the first permeate product; and recovering said second retentate. A further embodiment includes conventional processing of the first retentate.

In various embodiments, acid streams containing from about 70% to about 98% by weight acid, water, and hydrocarbons can be processed to form a permeate with lower hydrocarbon content. In embodiments where the acid is sulfuric acid, the water content of the acid stream is preferably 20% by weight or less, or 15% by weight or less, or 10% by weight or less.

Yet another embodiment of the invention relates to an improved alkylation process. The alkylation process comprises contacting an olefin mixture with an isoparaffin mixture in the presence of a liquid acid catalyst under conditions effective to produce an alkylate product. The liquid acid catalyst can be any liquid acid suitable for catalyzing the alkylation reaction such as sulfuric acid. The spent acid which is a mixture comprising sulfuric acid, hydrocarbons and water is recovered and processed using a first polymeric membrane to form a first retentate containing a substantially greater concentration of hydrocarbons than said spent sulfuric acid mixture and a first permeate product containing a greater concentration of sulfuric acid than the spent acid mixture. In one embodiment, the first permeate product is recycled back to the alkylation reactor. In a second embodiment, the first permeate product is optionally further processed to reduce its water content. This further processing can include using a second polymeric membrane to reduce water content. Each further processing through a polymeric membrane will form a first stream containing a substantially greater concentration of sulfuric acid than said first permeate product and a second stream containing a substantially greater concentration of water than said first permeate product. The first stream is recovered and recycled to the alkylation process. Further processing of the first permeate can also include evaporation under vacuum, adding acid anhydride, or adding oleum.

In still another embodiment, this invention provides a multi-layer membrane structure suitable for use in separating acids from impurities. The multi-layer structure of the membrane allows for a structure that combines desired properties of several materials. In an embodiment, the first layer of the structure is a crosslinked polymeric layer that provides preferential passage of the acid relative to at least one impurity, such as hydrocarbons, while also having good resistance to the acid environment. Additional layers of the structure can provide additional benefits for the membrane, such as providing structural integrity with little or no impact on overall flux, or providing overall mechanical stability for the membrane so that layers with different properties do not cause a material failure in response to the separation environment. For example, when exposed to elevated pressures, some materials are prone to stretching while others are not. A lower layer in the membrane that is rigid and able to withstand higher pressures can maintain the shape of the membrane under pressure, thus preventing failure of other, possibly thinner layers of the membrane.

Membranes and Membrane/Support

The present invention is directed in part to a polymeric membrane, possibly in the form of a layer that is part of a multi-layer membrane structure, that is suitable for acid-contaminated separation and its use in "regenerating" process acids. The polymeric membrane can withstand the acid environment and preferentially diffuses the acid over the retentate contaminant. These streams may comprise acid, and any combination of acid and hydrocarbons and/or water and other "contaminants". The process can be practical "in-situ" with common petroleum and petrochemical processes.

Though particularly described hereinafter in relation to use in a petroleum processing stream, the polymeric membrane has application to varied acid/liquid separations. Other applications where the polymeric membrane can be used for acid/liquid separation include, for example, chemical production (including agricultural chemical production), pharmaceutical applications, steel preparation, metal cleaning, and motor vehicle production. Additionally, though particularly described hereinafter in relation to purification of sulfuric acid streams that contain hydrocarbons, the polymeric membrane of the invention has application to separations for other types of acids, such as phosphoric acid, nitric acid, or other acids that can be highly concentrated.

The membranes according to the invention comprise crosslinked polymer membranes that are optionally part of a multi-layer membrane structure. The membranes and/or membrane structures used in the process according to the invention may be utilized in the form of hollow fibers, tubes, films, sheets, etc. The process may conveniently be carried out in a test cell which is divided into compartments by means of a membrane or membranes. The compartments will each have means for removing the contents therefrom. The process may be carried out continuously or batchwise, but preferably in a continuous manner.

In separating acid from acid waste streams the flow rate of the feed across the membrane surface (or exposed surfaces of a membrane structure) should be sufficient to prevent undue selectivity loss by concentration polarization. The flow rate of the feed depends on the particular geometry and configuration of the membrane or membrane structure and any supporting or containment vessel used, as well as on temperature. Generally, higher temperatures and lower flow rates can be tolerated. Establishing the optimum flow rate for a membrane configuration and set of operating conditions can be readily determined by a skilled practitioner.

Higher fluxes can be achieved by operating with the thinnest membrane that will maintain its physical integrity under the operating conditions. In another embodiment, to help the membrane maintain its physical integrity, a composite membrane may be used. For example, a thin selective polymeric layer (or membrane) may be supported on a non-selective, highly porous membrane, to produce a multi-layer laminate structure. The membrane layers in a multi-layer structure are preferably securely attached to one another. More generally, higher fluxes can be achieved by operating with the thinnest membrane layers in a multi-layer membrane structure that will maintain the physical integrity of the membrane structure under the operating conditions. The impact of a layer in the membrane structure will vary depending on the pore size in the layer.

In an embodiment involving a composite membrane, the membrane structure includes at least 2 layers. In such a composite membrane, the first layer is a crosslinked polymer membrane. When such a composite membrane is used for a separation process, preferably the first layer will include at least one surface that is exposed to the substance being separated. The first layer is attached to a second layer, such as polytetrafluoroethylene (PTFE) or Gore-Tex™, which is a chemically resistant polymer layer with a larger pore size than the top layer. The attachment of the first and second layer can be via chemical bonding, via a mechanical attachment due to intertwining of the polymer matrices of the first and second layer, or by any other convenient method. This second layer provides structural integrity for the first layer. Preferably, the second layer provides structural integrity without substantially altering the flow rate through the membrane stack. Preferably, the crosslinked membrane is supported by a secondary membrane having a membrane pore size selected to compliment the pore characteristics of the crosslinked membrane. The secondary membrane may also serve as a suitable substrate for the formation, deposition or coating of the primary membrane.

In another embodiment, a multi-layer membrane structure is provided that includes at least 3 layers. The first layer is a crosslinked polymer membrane. Preferably the first layer will include at least one surface that is exposed to the substance being separated. The first layer is attached to a second layer, such as polytetrafluoroethylene (PTFE) or Gore-Tex™, which is a chemically resistant polymer layer with a larger pore size than the top layer. The attachment of the first layer and second layer can be via chemical bonding, via a mechanical attachment due to intertwining of the polymer matrices of the first and second layer, or by any other convenient method. This second layer provides structural integrity for the first layer. Preferably, the second layer provides structural integrity without substantially altering the flow rate through the membrane stack. Preferably, the crosslinked membrane is supported by a secondary membrane having a membrane pore size selected to compliment the pore characteristics of the crosslinked membrane. The secondary membrane may also serve as a suitable substrate for the formation, deposition or coating of the primary membrane.

Figure 12:
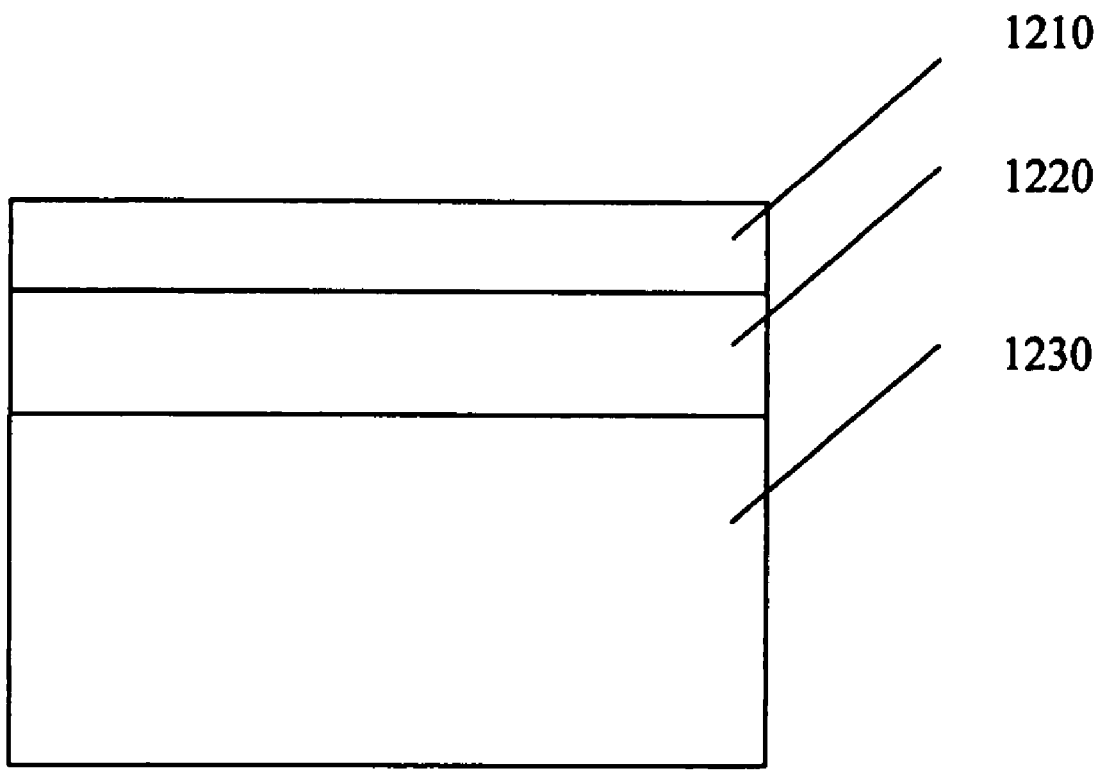
FIG. 12 schematically shows a multi-layer membrane structure according to the invention.

Preferably, the second layer is attached to a third layer, such as a structural layer with a still larger pore size. An example of such a membrane structure is schematically shown in FIG. 12. In such an embodiment, the combination of the second layer 1220 and third layer 1230 provides structural integrity for the first layer 1210. In particular, the second layer 1220 provides a chemically resistant support layer that the first layer 1210 can be attached to, while the third layer 1230 constrains the expansion or contraction of the second layer 1220 to prevent delamination of the first layer 1210 due to, for example, stretching of the second layer 1220 when pressure is applied to the membrane during a separation.

Crosslinked Polymeric Membrane

In various embodiments, a crosslinked polymeric membrane is used for performing a separation of acid from hydrocarbon, water, or other impurities. In an embodiment where the crosslinked polymeric membrane is part of a multi-layer membrane structure, the crosslinked polymeric membrane is the first layer of the structure. The crosslinked polymeric membrane, composed of a polymer such as a polyvinyl alcohol, can be characterized in part by a crosslink density. Crosslink density as used herein, is defined as the percentage of monomers reacted with a crosslinking agent, e.g., 5% crosslinking means that about 5% of the monomers have been reacted with the chemical cross-linking agent. Note that in embodiments where the crosslinked membrane comprises a copolymer or another polymer containing multiple types of monomers, the maximum possible crosslink density may be less than 100%. This situation occurs when one or more of the monomer types are not be capable of reacting with the crosslinking agent. The membrane crosslink density can range from about 1.0% to about 25.0%. In an embodiment, the membrane crosslink density is at least 1.0%, or at least 2.5%, or at least 3.0%, or at least 5.0%, or at least 7.5%, or at least 10.0%. Alternatively, the membrane crosslink density can be 25.0% or less, or 20.0% or less, or 17.5% or less, or 15.0% or less, or 12.5% or less, or 10.0% or less. In a preferred embodiment the crosslink density ranges from about 2.5% to about 20.0%, and most preferably ranges from about 5.0% to about 10.0%.

In another embodiment, the crosslinking density of the polymer membrane can be characterized relative to the number of crosslinked chains in the membrane. Preferably, the number crosslinked chains per 100 chains in the polymeric membrane is at least 85 per 100, or at least 90 per 100. This corresponds to a SOL content (which refers to the percentage of polymer chains that are not cross-linked and that can be removed from the membrane by immersion of the membrane in a suitable solvent) of about 15% or less, or about 10% or less.

While not fully understood, the crosslink density, as taught herein, produces a membrane that may be adapted to withstand acid environments typically encountered in petroleum processing applications, such as sulfuric acid alkylation. The degree of crosslinking is also believed to influence the selectivity and flux characteristics of the membrane, in addition to its mechanical and structural stability. Preferably, the membrane crosslink density is substantially uniform in the direction of material flux during a separation process. More preferably, the membrane crosslink density is substantially uniform throughout the volume of the membrane. This means that the membrane does not contain a substantial gradient in the crosslink density in any direction.

In an embodiment, the crosslinked polymer membrane is formed from a polymerized alcohol, an oxoanion modified polymerized alcohol, or a combination thereof. Combinations of alcohols represent copolymers, terpolymers, or other combinations of monomer units to form a polymer. Examples of polymerized alcohols include polyvinyl alcohol (PVA), polypropyl alcohol, and polybutyl alcohol. To form an oxoanion modified polymerized alcohol, an alcohol such as polyvinyl alcohol is exposed to an oxoanion reagent that results in substitution of at least a portion of the alcohol groups with an oxoanion. Possible oxoanion substituted alcohols based on PVA include polyvinylsulfate (PVS), from the reaction of polyvinyl alcohol with sulfuric acid, and polyvinyl phosphate. Other inorganic oxoanion modified polymer membranes may also be used, such as PVA (or another alcohol) modified with arsenate, antimonate, or bismuthate to form polyvinyl arsenate, polyvinyl antimonate, and polyvinyl bismuthate, respectively. Calcogenic oxides, such as polyvinyl selenate and polyvinyl telurate, formed from the reaction of selenic and teluric acids with PVA may also be used. Still another suitable membrane can be formed by reacting PVA with boric acid.

In an embodiment where the membrane is composed of polyvinylalcohol (PVA), the PVA membrane is preferably crosslinked using 1,4 diisocyanatohexane before use in an acid environment. Preferably the membranes are made of crosslinked PVA, PVS/crosslinked PVS, and/or other crosslinked oxoanion modified PVAs. Other suitable crosslinking agents include 1,4 diisocyanatobutane, 1,8 diisocyanatooctane, 1,12 diisocyanatododecane, 1,5 diisocyanato-2-methyl pentane, and 4,4' diisocyanato-diphenylmethane.

Other material choices are also possible for forming crosslinked polymers according to the invention. In an embodiment, a polymer membrane can be formed from vinyl acetate monomer units. When vinyl acetate is exposed to an acidic environment, the acetate functional group will hydrolyze and form vinyl alcohol. This vinyl alcohol can then be crosslinked as described above.

Still another potential membrane material is 4-vinylpyridine. Unlike polymerized alcohols, 4-vinylpyridine achieves crosslinking by forming bonds at the nitrogen in the pyridine ring. As a result, an alternate type of crosslinker is required. Examples of suitable crosslinking agents include alkyl or aromatic dihalides.

In still other embodiments, the membrane material can be a polymer material that satisfies several characteristics. First, the polymer must be capable of crosslinking to form a crosslinked polymer membrane. When the polymer undergoes crosslinking, the resulting crosslinked membrane should have at least 80% of the polymer chains crosslinked to one another, or at least 85%, or at least 90%, or at least 95%, or at least 99%. A polymer membrane with too low of a percentage of polymers crosslinked to one another will be susceptible to breakdown when exposed to an acid environment. Second, the polymer material should be resistant to acid environments such as solutions having 70 wt % or more of sulfuric acid.

A third characteristic is that the polymer membrane should provide sufficient solubility for the acid being separated so that the membrane will selectively allow acid to pass through while restricting the passage of hydrocarbons. Without being bound by any particular theory, it is believed that one indicator of a suitable polymer is whether the polymer can exchange or otherwise acquire an ion similar to the acid being separated. For example, when a PVA membrane is exposed to sulfuric acid, at least a portion of the alcohol groups in the PVA will be exchanged with sulfate groups. It is believed that this substitution enhances the solubility of sulfuric acid in the membrane. In another example, the nitrogen contained in the ring of polyvinylpyridine is capable of complexing with a sulfate or bisulfate ion to increase the sulfate content of the membrane. Again, this is believed to improve the solubility of sulfuric acid within the membrane, which facilitates separation. Note that the ion acquired by the membrane does not need to directly correspond to the type of acid being separated. For example, a PVA membrane exposed to phosphate ions will form polyvinylphosphate. Such a membrane should be suitable for performing sulfuric acid separations.

In yet other embodiments, the polymerized membrane can be a copolymer or other polymer composed of multiple monomers. In such embodiments, one or more of the monomers may not include a functional group capable of reacting with the selected crosslinker. Possible monomers that are compatible for use in forming a copolymer according to the invention include styrene, styrene sulfonate, acrylic acid, methacrylic acid, styrene sulfonic acid, vinyl pyridine, and acrylamide. In another embodiment, anionic/cationic monomers may generally be incorporated into a copolymer.

Note that copolymers, terpolymers, or other polymers that include multiple types of monomers may include monomers that do not participate in crosslinking. Such polymers should include a minimum amount of the monomer participating in crosslinking. In an embodiment, the amount of the monomer having the participating crosslinking site (such as PVA or 4-vinyl pyridine) is at least 20 wt %, or at least 30 wt %, or at least 40 wt %, or at least 50 wt % of the monomers in the polymer. In such embodiments, at least 5 wt %, or at least 10 wt %, or at least 15 wt %, or at least 20 wt % of the crosslinking monomers participate in crosslinks. In a copolymer composed of multiple monomers, the arrangement of the monomers can be as a random copolymer, a block copolymer, an alternating copolymer, a tapered copolymer, or any other convenient arrangement. Similarly, a polymer containing three or more types of monomers can have the monomers arranged in any convenient manner.

In an embodiment, the thickness of the crosslinked polymer membrane can be at least 0.1 µm, or at least 0.2 µm, or at least 0.3 µm, or at least 0.5 µm, or at least 1.0 µm, or at least 2 µm, or at least 5 µm, or at least 10 µm, or at least 20 µm. Alternatively, the thickness of the crosslinked polymer membrane can be 50 µm or less, or 40 µm or less, or 30 µm or less, or 20 µm or less, or 10 µm or less. For thin crosslinked polymer membranes, formation of the membrane can be assisted by starting with a high molecular weight polymer, such as high molecular weight PVA. This can then be thinned out to form the desired thickness while still retaining sufficient viscosity to allow membrane formation. The upper limit on membrane thickness is dictated by the desired flux across the membrane during a separation. As the thickness of the membrane increases, the flux decreases.

Second Layer of Membrane Structure

The second layer of the membrane structure serves as a structural layer that is chemically resistant to an acid environment. Preferably, the membrane pore size of the second layer is selected to compliment the pore characteristics of the primary membrane. The secondary membrane may also serve as a suitable substrate for the formation, deposition or coating of the primary membrane.

In an embodiment, the second layer is a microporous polymer film such as Gore-Tex™. More generally, the second layer can be composed of a fluoropolymer, such as polytetrafluoroethylene (PTFE), expanded PTFE, polyvinylidenedifluoride (PVDF), or a cellulosic polymer. The pore size of the second layer should be large enough to minimize flux reduction while being small enough to provide structural support for the first layer. In particular, the pore size of the second layer must be small enough relative to the thickness of the top layer to prevent collapse of the top layer. Preferably, the pore size of the second layer will be less than half of the thickness of the first layer. In an embodiment, the pore size of the second layer is at least 0.05 μm. In another embodiment, the pore size of the second layer is 0.25 μm or less, or 0.2 μm or less.

The second layer should allow the first layer to bond or otherwise attach to at least one surface of the second layer. Any convenient method can be used to attach the first layer to the second layer. In an embodiment where the first layer is PVA and the second layer is an expanded PTFE, the attachment of the first layer to the second layer can be facilitated by selecting an appropriate solvent system for the PVA layer. For example, the PVA can be dissolved in a solution containing roughly equal parts of DMF and DMSO. The DMF/DMSO solvent system has some ability to wet an expanded PTFE surface. In particular, this solvent system should prevent beading of the PVA solution when the PVA solution is deposited on the expanded PTFE. The solvent system will also allow some diffusion into the pores of the expanded PTFE, so that when the crosslinked PVA layer finishes forming, the PVA and expanded PTFE layers will be structurally connected.

In an embodiment, the second layer will have a thickness of at least 10 μm, or at least 15 μm, or at least 20 μm, or at least 25 μm, or at least 30 μm, or at least 35 μm, or at least 40 μm. In another embodiment, the thickness of the second layer is 100 μm or less, or 90 μm or less, or 80 μm or less, or 70 μm or less, or 60 μm or less, or 50 μm or less. Preferably, the thickness of the second layer is from about 25 μm to about 75 μm. Note that thicknesses of greater than 100 μm are possible for the second layer while still allowing the membrane stack to perform separations. However, such larger sizes for the second layer can lead to reductions in the possible flux through the membrane during a separation process.

Third Layer of Membrane Structure

In some embodiments, the polymeric membrane is part of a multi-layer membrane structure that includes a third layer. The third layer of the membrane structure provides additional structural integrity. Because the second layer preferably has a thickness of at least 10 μm, a third layer can have larger pore sizes while still providing sufficient structural stability. The larger pore sizes minimize any reduction in flux across the membrane structure during a separation process.

The third layer can assist in providing mechanical and dimensional stability for the membrane, such as when the membrane is used in a pressurized environment. For example, if the second layer is composed of an expanded PTFE, the second layer will be susceptible to stretching under pressure. However, a first layer composed of a material such as crosslinked PVA will tend to crack rather than stretch under similar conditions. In this type of situation, a third layer can be selected that will not stretch when subjected to pressure. This will constrain the second layer, thus minimizing stretching and preventing cracking of the crosslinked PVA layer.

A variety of materials are suitable for use in the third layer. The third layer can be composed, for example, of polyolefin, crosslinked natural rubber, saturated polyethylene, saturated polypropylene, a copolymer of two of the above, or a copolymer of one of the above with a poly-α-olefin. In another embodiment, the third layer polymer can incorporate macro-, meso-, and nano-fillers to modify the structural properties of the material. Suitable fillers can include ground glass, carbon fibers, mica, clays, or exfoliated clays. The fillers can be in any convenient form, such as spheres or fibers. In still another embodiment, the third layer could be composed of a ceramic, such as a ceramic formed by a sol-gel procedure.

Suitable materials for use in the third layer can be characterized by a variety of metrics. In an embodiment, the air permeability of the third layer is at least 5 $dm^3/s*m^2$, or at least 10 $dm^3/s*m^2$, or at least 25 $dm^3/s*m^2$, or at least 50 $dm^3/s*m^2$, or at least 100 $dm^3/s*m^2$, or at least 500 $dm^3/s*m^2$. Preferably, the air permeability of the third layer is higher than the air permeability of the second layer. For example, in an embodiment where the second layer is composed of an expanded PTFE, the air permeability of the second layer will likely be between is about 1-5 $dm^3/s*m^2$. In such an embodiment, a third layer can be selected to have an air permeability greater than about 5 $dm^3/s*m^2$.

The material for the third layer can also be characterized based on the intrinsic bulk material values of the material. An intrinsic bulk material value for a material is a material value based on a non-porous sample of the material. This is in contrast to a material value for a material that has been synthesized or modified in a manner to cause the material to be porous, stretched, etc. Material values such as the tensile modulus or flexural modulus will vary depending on whether the material is in its bulk form or in a modified form, such as a porous or stretched form. Preferably, the intrinsic bulk material values of the third layer material can include one or more of the following: a 10,000 psi tensile modulus at 25° C. as measured by ASTM D638; an elongation at break of about 10% or less as measured by ASTM D638; a flexural modulus at 25° C. of greater than about $100 \times 10^3$ psi as measured by ASTM D790; a tensile strength at break at 25° C. of greater than about 100 psi as measured by ASTM D638.

In another embodiment, the third layer material can be characterized by the volumetric change of the material relative to the solvents and/or acid that the membrane structure will come into contact with during synthesis and processing. When a material is exposed to a solvent or acid, the material may absorb some of the solvent or acid. The material with the absorbed solvent or acid may occupy a different volume than the material alone. This difference in volume corresponds to the volumetric change of the material relative to the solvent and/or acid that has been absorbed. Preferably, the third layer material should undergo a volumetric change of about 10% or less in any solvent or acid the material is expected to contact. For example, during synthesis of the membrane structure, the third layer may come into contact with the solvents used for depositing the first and/or second layers. In embodiments where the first and/or second layer are synthesized using a blend of DMSO and DMF as a solvent, the third layer should have a volumetric change of about 10% or less in both DMSO and DMF. If the membrane structure is intended for use for sulfuric acid separation, the third layer should also have a volumetric change of 10% or less in sulfuric acid. Additionally, the volumetric change of the third layer material should be similar to the volumetric change of the second layer material relative to the solvent and/or acid that both will be exposed to. Differences in the volumetric change of the second and third layers could result in strain developing at the layer interface, possibly leading to failure of the membrane structure. Preferably, the difference in the volumetric change values between the second layer and third layer is about 2% or less, or about 1% or less. For example, if the volumetric change of the second layer is 5%, a difference in the volumetric change values of about 2% or less would mean that the volumetric change of the third layer would be between about 3% and about 7%.

In addition to being composed of a suitable material, the third layer should also have sufficient porosity to minimize any reduction in flux through the membrane due to the third layer. In an embodiment, the pore size of the third layer is at least 3 μm, or at least 4 μm, or at least 5 μm, or at least 7.5 μm, or at least 10 μm. Preferably, the pore size of the third layer is sufficient so that substances which pass through the first layer of the membrane are in a "free flow" condition when passing through the third layer. Materials with sufficient porosity for use in the third layer are commercially known. For example, suitable polyolefin materials include materials available from Freudenberg, such as the FO2430 or FO2431 polypropylene/ polyethylene nonwoven materials or the FO2440 or FO2450/ 010 polyphenylene sulfide nonwoven materials. Alternatively, a porous material can be synthesized. For example, the methods described in "Thin-film membranes derived from co-continuous polymer blends: preparation and performance," (Polymer, Vol. 45 (2004) pg. 5597-5609) can be used to form a polymer with sufficient porosity.

In an embodiment, the thickness of the third layer can be at least 50 μm, or at least 100 μm, or at least 125 μm, or at least 150 μm, or at least 175 μm. In another embodiment, the third layer can have a thickness of 250 μm or less, or 225 μm or less, or 200 μm or less, or 175 μm or less.

The second layer can be bonded or otherwise attached to the third layer by any convenient method. For example, if the third layer is available as a sheet of material, the second layer can be attached to the third layer by melt processing, calendaring, or another lamination technique.

In general, by adjusting polymer solution concentration and coating thickness one can make membrane of any thickness. However, for commercial applications it should be between submicron to several microns in thickness.

Separation Processes

In separating acid from acid waste streams the flow rate of the feed across the membrane surface should be sufficient to prevent undue selectivity loss by concentration polarization. The flow rate of the feed depends on the particular geometry and configuration of the membrane or membrane structure and any supporting or containment vessel used, as well as on temperature. Generally, higher temperatures, lower flow rates can be tolerated. Establishing the optimum flow rate for a membrane configuration and set of operating conditions can be readily determined by a skilled practitioner.

In one embodiment, the feed to a membrane unit is maintained under conditions of pressure such that substantially all of the acid is in liquid phase. The permeate may be withdrawn in a vacuum, which is generally maintained in the range of 2 to 150 mm Hg. The permeated phase will be in a vapor phase, and subsequently condensed by cooling in a condenser. This process is generally known in the art as pervaporation.

The vacuum on the permeate side of the membrane can affect both selectivity and flux. The selectivity and the flux generally increase as the vacuum pressure on the permeate increases. Higher vacuum pressure can be tolerated at higher temperatures, or with a lower boiling point acid. In yet another embodiment, a sweep gas may be passed across the membrane at a rate sufficient to increase the permeation rate. Suitable sweep gases include carbon dioxide, nitrogen, hydrogen, air, or low boiling hydrocarbons such as methane, ethane or propane.

Alternatively, the permeate side of the membrane may be swept by a liquid perstraction solvent in which the permeate is soluble and which is non-corrosive with respect to the membrane, at a rate sufficient to enhance the permeation rate of the permeable component or components through the membrane. Suitable perstraction solvents include higher molecular weight paraffins, organic acids, and compressed gases, e.g., ethane, propane, butane, etc. Especially suitable perstraction solvents are those which do not form azeotropic mixtures with any of the components of the waste acid mixture.

After reaching the permeate side of the membrane, the permeate can be collected in a vessel, or a stream of permeate can be formed. Any collected permeate (or permeate in a stream) will mix with other substances already present on the permeate side of the membrane. A quantity of substance that has passed through a membrane (i.e., a permeate), optionally mixed with one or more miscible substances that were already present on the permeate side of the membrane, is defined herein as a permeate product. For example, if a perstraction solvent is present on the permeate side of a membrane during a separation, the permeate product will be composed of the permeate plus the perstraction solvent. If no other substance is present on the permeate side of the membrane during a separation, the permeate product will comprise only the permeate.

Referring now to FIG. 1, a spent acid stream 10 such as a spent sulfuric acid stream comprising acid, and contaminant such as water and hydrocarbons, is fed via a pump 12 or some other means to a membrane unit 14. The membrane unit comprises a PVS membrane 16 that is selectively permeable to acid relative to the contaminants typically present in the spent acid stream. In a preferred embodiment, membrane 16 is supported by a contiguous support membrane 16a. In embodiments where a multi-layer membrane structure includes 3 or more layers, membrane 16a can correspond to multiple support layers. The selectively permeable membrane 16 separates the feed into two products, a first permeate stream (i.e., permeate product) 18 and a first retentate stream 20. The first permeate stream 18 has increased acid concentration and reduced contaminant content. The first retentate stream 20 has increased contaminant content.

To illustrate an application of the invention, a feed that simulates four variants of an acid waste stream from a conventional sulfuric acid alkylation process was run on a single membrane embodiment as illustrated in FIG. 1. Feed versus permeate product data for the simulation of the four different acid feeds is shown in Table 1.

TABLE 1

| DATA FOR THE EMBODIMENT OF FIG. 1 | | | | |
|---|---|---|---|---|
| Feed Composition | | | | |
| Acid (wt %) | 86.0 | 88.0 | 90.0 | 92.0 |
| ASO (wt %) | 10.0 | 8.0 | 6.0 | 4.0 |
| Acid/Water Ratio | 21.5 | 22.0 | 22.5 | 23.0 |
| Permeate Product Composition | | | | |
| Acid (wt %) | 89.6 | 91.4 | 93.0 | 94.4 |
| ASO (wt %) | 6.5 | 4.7 | 3.0 | 1.6 |
| Acid/Water Ratio | 22.5 | 22.9 | 23.2 | 23.4 |

Table 1 shows that the permeate product has a greater weight percentage of acid than the corresponding acid mixture used as the feed. Table 1 also shows the ratio of acid to water in the initial feed stream and the permeate product for each of the four acid feeds. As shown in Table 1, the acid to water ratio in each permeate product is greater than the acid to water ratio in the corresponding feed stream. In another embodiment, the acid to water ratio of a permeate product can be greater than or equal to the acid to water ratio of the corresponding feed stream. Preferably, the acid to water ratio of the permeate product is at least 1% greater than the acid to water ratio of the corresponding feed stream, or at least 5% greater, or at least 10% greater.

The first permeate stream 18, referred to as the acid and water product low in hydrocarbons, may preferably contain hydrocarbons in an amount ranging from about 0 to about 7 percent by weight, preferably less than about 5 percent by weight. It may also contain acid in an amount of from about 89 to about 96 percent by weight and water in an amount of from about 3 to about 5 percent by weight.

Retentate stream 20 may contain hydrocarbon in an amount of from about 7 to about 30, acid in an amount of from about 65 to about 89, and water in an amount of from about 2 to about 4 percent by weight.

In a preferred embodiment, the separation mechanism is understood to be the "solution-diffusion" type. According to this mechanism feed components which have higher solubility in the polymer material get preferentially sorbed and then diffuse through the membrane to the permeate side. Separation is based primarily on sorption and diffusion.

Figure 2:
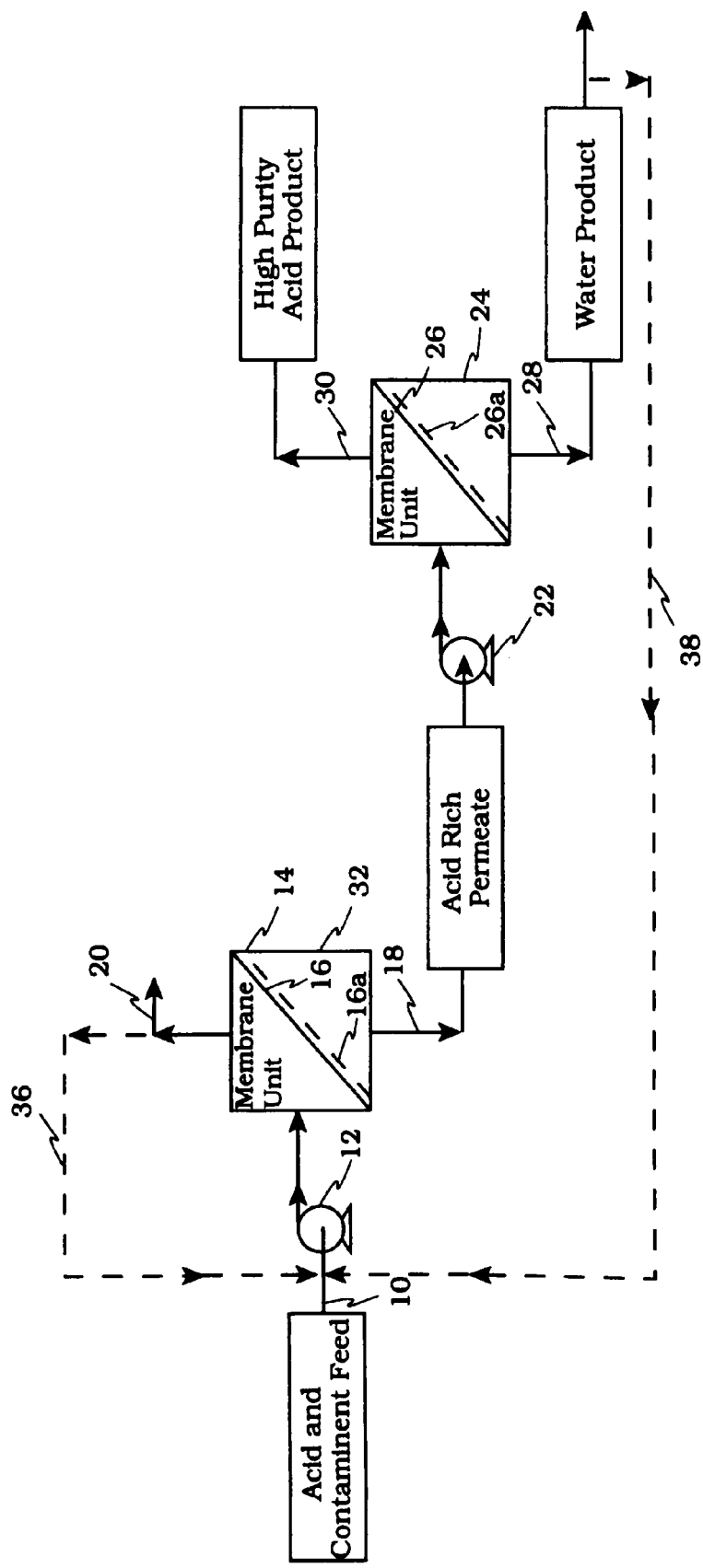

The invention further includes feeding the first permeate stream 18 via a second pump 22 or some other means to a second membrane unit 24, as illustrated in FIG. 2. Referring to FIG. 2, the spent acid 10 is fed to first membrane unit 14 where membrane 16 is selectively permeable to acid as described in respect of FIG. 1, or alternatively, is selectively permeable to acid and water relative to contaminants other than water such as hydrocarbons. The second membrane unit 24 comprises a membrane 26 that is selectively permeable to water over the acid. Passing the first permeate stream 18 through the second membrane unit 24, the membrane 26 produces a second permeate stream 28 and a second retentate stream 30. The second permeate stream is rich in water. The second retentate stream 30 is rich in acid. Membranes 16 and 26 may be preferably supported by membrane supports 16a and 26a, respectively. A calculated material balance for the embodiment of FIG. 2 is provided in Table 2. The hydrocarbon rich retentate 20 may be removed for conventional further processing, or optimally re-cycled to the feed stream, illustrated as 36. The acid and water rich permeate stream 18 is conventionally fed via pump 22 or other means to a second membrane unit 24. Alternatively, permeate stream 18 may be further processed by vacuum evaporation to remove water, or by the addition of an acid anhydride, such as $SO_3$, or oleum for example.

TABLE 2

MATERIAL BALANCE FOR THE EMBODIMENT OF FIG. 2

| | Stream | | | | |
|---|---|---|---|---|---|
| | 10 | 20 | 18 | 28 | 30 |
| Acid, wt % | 89.00 | 69.35 | 91.18 | 74.11 | 93.71 |
| ASO, wt % | 7.00 | 27.54 | 4.72 | 3.66 | 4.88 |
| Water, wt % | 4.00 | 3.11 | 4.10 | 22.23 | 1.41 |
| Total Flow, tons/day | 100.00 | 10.00 | 90.00 | 11.62 | 78.38 |

Preferably, the acid in the feed stream 10 may range from about 83 to about 95 wt %, ASO (or hydrocarbons) from about 2.0 to about 15 wt % and water from about 0.5 to about 4 wt %. As Table 2 shows, the first retentate 20 contains a substantially greater concentration of hydrocarbons (ASO) than the feed mixture, and the first permeate product 18 contains a substantially greater concentration of acid than the feed mixture. A substantially greater concentration of hydrocarbons in the retentate than the feed mixture means a weight percentage of hydrocarbons in the retentate that is greater than the weight percentage of the hydrocarbons in the feed mixture by at least about 3 wt %, preferably at least about 10 wt % and more preferably at least about 18 wt %. A substantially greater concentration of acid in the permeate product than the feed mixture means a weight percentage of acid in the permeate product that is greater than the weight percentage of acid in the feed mixture by at least about 1 wt %, preferably at least about 3 wt %, and more preferably at least about 6 wt %.

Also, Table 2 shows that the second retentate contains a substantially greater concentration of acid than the first permeate product, and the second permeate product contains a substantially greater concentration of water than the first permeate. A substantially greater concentration of acid in the second retentate than the first permeate product means that the weight percentage of acid in the second retentate is greater than the weight percentage of the acid in the first permeate product (i.e., the feed mixture to the second membrane) at least about 1 wt %, preferably at least about 3 wt %, and more preferably at least about 6 wt %. A substantially greater concentration of water in said second permeate product then said first permeate product means that the weight percentage of water in said second permeate product is greater than the weight percentage of water in said first permeate product at least about 3 wt %, preferably at least about 10 wt %, and more preferably at least about 18 wt %.

In the embodiment of FIGS. 1 and 2, the membranes 16 and 26 are preferably operated at conditions of temperature and pressure sufficient to maintain the acid in the liquid phase, e.g., temperature in the range of about −10° C. to about 300° C., more preferably from about 0° C. to about 50° C., and most preferably from about 4° C. to about 40° C. Preferably, membrane 16 is operated from about 100 to about 5000 psig, more preferably from 800 to 1200 psig on the feed side. The pressure on the permeate side is typically atmospheric pressure, but it could be operated at higher pressure so long as the pressure difference across the membrane is sufficient for permeation purposes. Membrane 26 is preferably operated in pervaporation mode with the feed pressure typically atmospheric and the permeate side under vacuum. The water containing product 28 (second permeate product) may preferably contain greater than about 4 percent by weight water, less than about 10 percent sulfuric acid. The high purity acid product 30 (second retentate) may preferably contain greater than about 91 percent by weight sulfuric acid, less than about 10 percent by weight hydrocarbons and less than about 3 percent by weight water.

In one embodiment of the present invention shown in FIG. 2, a portion of the first retentate 20 and/or the second permeate product water 28 may be recycled (illustrated by dashed line 36 and 38) to the feed waste acid stream 10 for further processing. Also, it should be understood that more than one membrane unit can be used in series and/or parallel configurations for each stage of the separation process. In the first stage one or more membranes 16 that are permeable selective to acid and water over the hydrocarbons of the spent acid feed stream 10 can be used. The number of membranes in each stage will depend on a number of factors including the desirable purity of the permeate product in each state, the composition of the feed, the type of the polymeric membrane or membranes used and the process conditions under which the membranes are operated.

Figure 3:
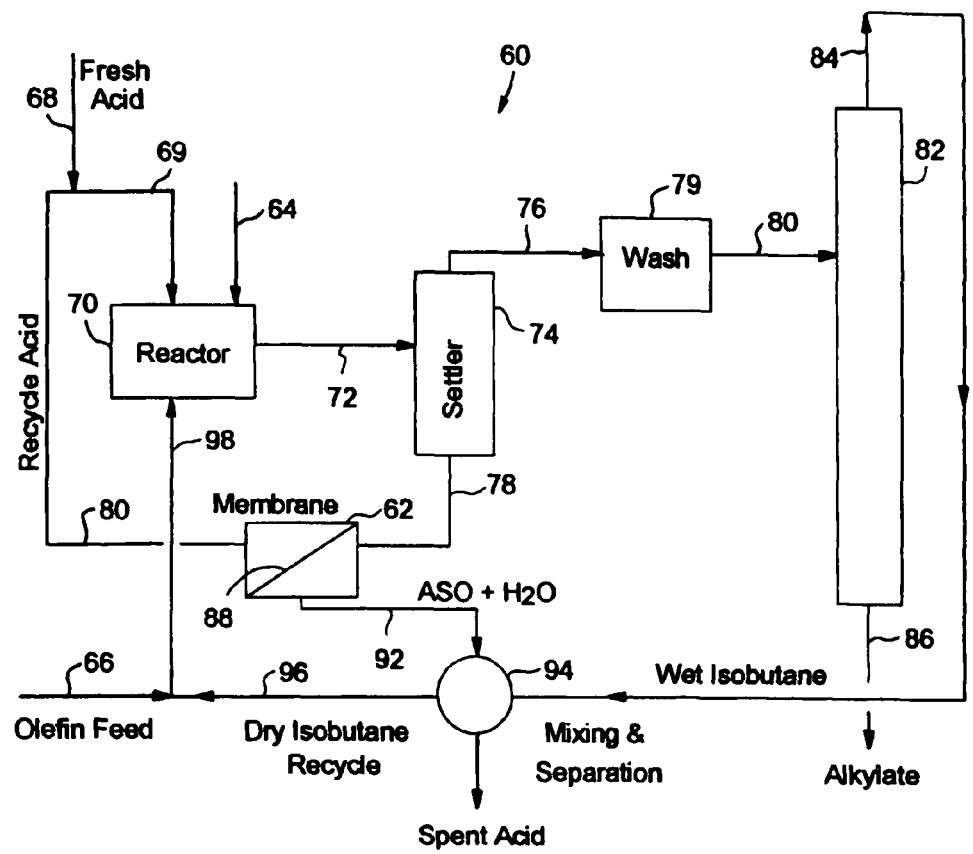

One advantage of the present invention may be appreciated by reference to an improved alkylation process for the manufacture of higher octane gasoline blending component, the improvement residing in the use of membranes to regenerate the spent acid. Referring now to FIG. 3, the invention is illustrated embodied in an improved alkylation process 60. The alkylation process includes at least one membrane separation unit 62 for controlling both the acid soluble oil ("ASO") and water concentrations in the alkylation process 60.

More specifically, a fresh isobutane stream 64 is fed to a reactor 70 where it is reacted with olefins 66 such as butenes in the presence of an acid catalyst 69 such as sulfuric acid. The alkylation product 72 from reactor 70 is transferred to a settler 74. Settler 74 separates the alkylation product into a spent acid stream 78 and hydrocarbon stream 76. The strength of the spent sulfuric acid stream 78 is reduced because of moisture and ASO material generated due to undesirable side reactions in the alkylation reactor 70. The hydrocarbon stream 76 from settler 74 is transferred to a wash unit 79 where it is caustic and water washed. Then via line 80 it is transferred to a fractionation column 82 to recover an alkylate stream 86 and an overhead stream 84. The overhead stream 84 contains mainly isobutane with some small amount of propane and n-butane.

The isobutane stream 84 contains soluble water picked up in the caustic and water wash. Of course, water is an undesirable component of the alkylation process, as it dilutes the sulfuric acid strength in addition to causing corrosion problems. The spent acid stream 78 from settler 74 is directed to a membrane unit 62 to remove ASO and water. An ASO rich spent acid stream 92 is then used to reduce the water concentration in the recycled isobutane stream 84 by contacting the two streams in unit 94 so that the water dissolves in the spent acid phase. A dry isobutane recycle stream 96 is mixed with the olefin stream 66 and then transferred to said reactor 70 via line 98. It is also possible to feed stream 66 and stream 96 separately to reactor 70.

This invention reduces the water and ASO concentrations in the alkylation process acid stream, maintaining acid strength in the alkylation process, which in turn maintains or increases the alkylation efficiency, and helps to enhance the octane value of the alkylation product. This process will also reduce the cost of sulfuric acid regeneration by reducing the total amount of spent acid shipped for regeneration.

Figure 4:
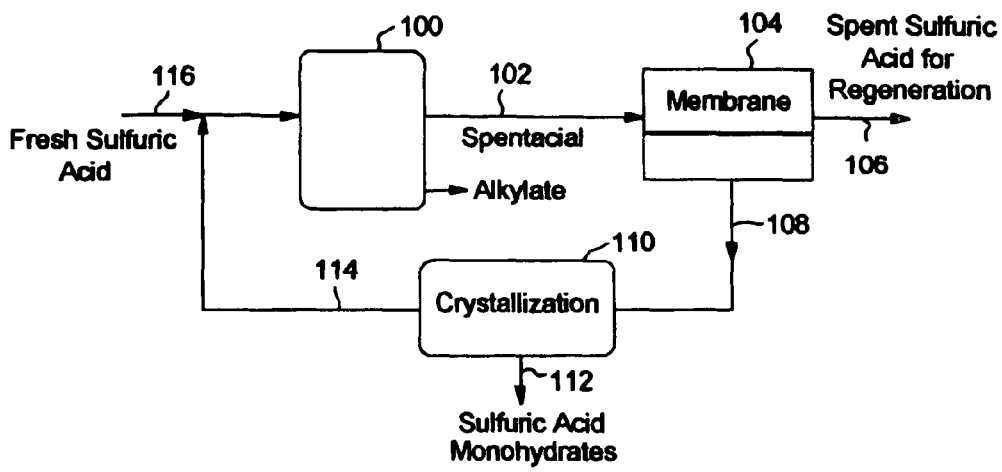

Yet another embodiment of the present invention includes a crystallization step to remove water from the recycled spent acid, as shown in FIG. 4. A membrane unit 104 is used as explained above to remove ASO from a spent acid stream 102 of an alkylation process 100. The ASO lean stream 108 is then chilled in a crystallization unit 110 to crystallize sulfuric acid monohydrates to remove water from the recycled spent acid stream via stream 112. Stream 114 is recovered sulfuric acid send back to the alkylation process. In a variation of this embodiment crystallization could be replaced with an adsorber unit (not shown) to remove water from stream 108.

Figure 5:
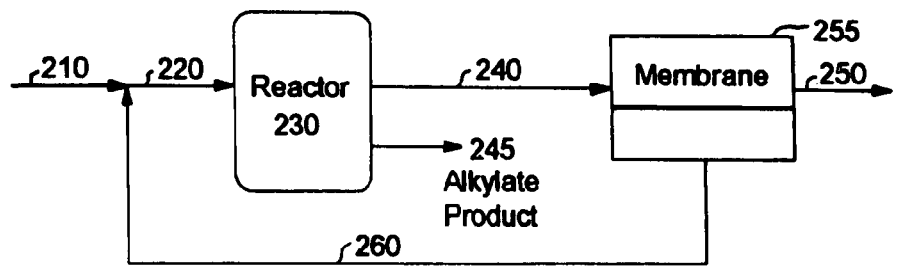

In yet another embodiment shown in FIG. 5, a $SO_3$ and/or oleum stream 210 is mixed with a membrane separated sulfuric acid stream 260 prior to sending the treated sulfuric acid to the alkylation unit 230. The addition of $SO_3$ and/or oleum reduces the water concentration in the treated sulfuric acid stream 260 resulting in an increase in acid strength in the sulfuric acid stream 220 which in turn helps to enhance the octane value of the alkylation product 245. Spent acid 240 is passed through at least one membrane unit 255, as explained above, to produce a first stream 250 higher in ASO concentration and which is sent to a conventional spent acid regeneration facility and a higher strength sulfuric acid stream 260 which is recycled to the alkylation reactor. An example of a material balance for the various streams of the embodiment of FIG. 5 is provided in Table 3.

TABLE 3

MATERIAL BALANCE EMBODIMENT OF FIG. 5

| Components | 210 Oleum | 220 | 230 | 240 Spent Acid | 250 | 260 |
|---|---|---|---|---|---|---|
| Acid (wt %) | 97.15 | 94.50 | 0 | 86.57 | 80.02 | 91.12 |
| Water (wt %) | 0 | 1.93 | 16.82 | 3.18 | 2.94 | 3.35 |
| $SO_3$ (wt %) | 2.85 | 0 | 0 | 0 | 0 | 0 |
| ASO (wt %) | 0 | 3.50 | 83.13 | 10.24 | 17.04 | 5.53 |
| Total (MeT/Day) | 33.50 | 94.17 | 8.63 | 102.8 | 42.13 | 60.67 |

The invention will be further illustrated by the following examples.

EXAMPLES

Example 1

0.9 g of polyvinylalcohol (PVA) was dissolved into an anhydrous 50/50 mixture of (DMSO) and dimethylforamide (DMF). In this example, PVA was added to a 15 g/15 g DMSO/DMF solvent mixture. The PVA (Aldrich Chemical Co.) was 99% hydrolyzed and had a molecular weight between 124-186 Kg/mol. The solution was subsequently heated to 80° C. for approximately 5 hours. The solution was then cooled to 10° C. and mixed with 0.084 g of hexamethyldiisocyanate dissolved in an anhydrous 2.5 g DMSO/2.5 g DMF mixture (also cooled to 10° C.). Preferably, the hexamethyldiisocyanate used has little or no exposure to water vapor, including water vapor from air. The solution visually became more viscous due to the reaction of the PVA and the diisocyanate. After approximately 2-3 minutes, the 2.7 wt % solution was cast onto a 0.2 micron pore size PTFE substrate using conventional casting knife procedures. This solvent system was selected due to its favorable solubility characteristics and its corresponding chemical inertness.

The PTFE substrate was placed on a support glass plate. The solution of PVA and crosslinking agent was knife coated on top of the support. The coating was first dried overnight (room temperature) under a continuous flow of nitrogen gas. Further drying was performed by thermal treating the membrane in a vacuum oven at 130° C. for 5 hours to ensure completion of the crosslinking reaction (approximately 5%) as well as to ensure complete evaporation of the solvent. The dried membrane was next tested with a spent acid solution in Sepa®ST membrane cell from Osmonics at 24° C.

The feed was pressurized to 700 psig, and permeate pressure was at atmospheric pressure. Feed and permeate streams were analyzed for compositions. Initial permeate rate was 1.83 kg/hr/m$^2$.

First Test

| Components | Spent Acid Solution Feed Composition | Permeate Product Composition |
|---|---|---|
| Acid (wt %) | 89.2 | 91.6 |
| Water (wt %) | 4.4 | 5.4 |
| Acid Soluble Oil (wt %) (or Hydrocarbons) | 6.5 | 3.0 |

A second membrane test performed at 300 psig feed pressure and atmospheric pressure permeate gave an initial flux of 3.6 kg/hr/m$^2$. Feed and permeate product compositions are reported below.

| Components | Spent Acid Solution Feed Composition | Permeate Product Composition |
|---|---|---|
| Acid (wt %) | 87.8 | 90.8 |
| Water (wt %) | 4.1 | 4.7 |
| Acid Soluble Oil (wt %) (or Hydrocarbons) | 8.1 | 4.5 |

The synthesis procedure described in this example can be used for forming crosslinked polyvinylalcohol membranes and other hydroxyl-containing polymers and copolymers, e.g., copolymers of vinylacetate and vinylalcohol membranes for use in separation of ASO from sulfuric acid in the alkylation process. Several parameters that can be controlled are as follows:
  (1) The degree of crosslinking, i.e., pore volume, can be controlled by the addition of a predetermined amount of the crosslinking agent, such as diisocyanates.
  (2) The chemical structure of the crosslinking agent determines the physical (e.g., membrane mechanical properties) and chemical properties (e.g., interaction with the feed stream). The structures of the diisocyanates useful in this invention exemplifies the wide range of potential crosslinking agents (O=C=N—R—N=C=O, where R can be aliphatic and/or aromatic in nature). The structures of the diisocyanates useful in this invention includes mixtures and blends of aliphatic and/or aromatic diisocyanate structures.
  (3) The control of the polar/nonpolar characteristics can be controlled via the proper selection of the amount and structure of the crosslinking agent and the structure of the polymer or copolymer. The level of hydrogen-bonding in the crosslinked network is a direct function of the extent of crosslinking, i.e., amount of vinyl alcohol units.

Example 2

Figure 6:
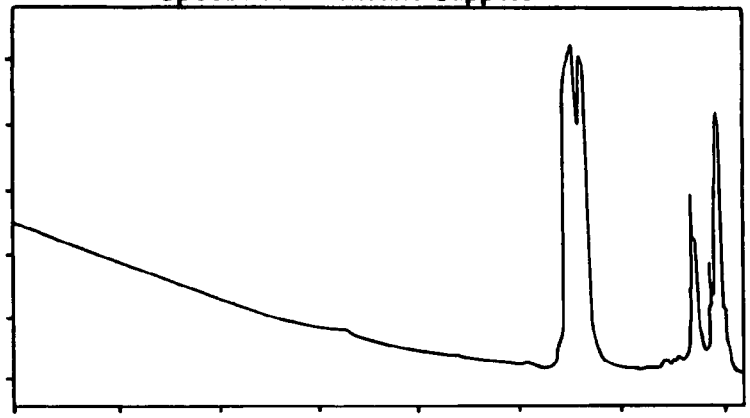
FIG. 6 is a FTIR spectra of a Teflon membrane support having a nominal pore size of 0.2 microns.
Figure 7:
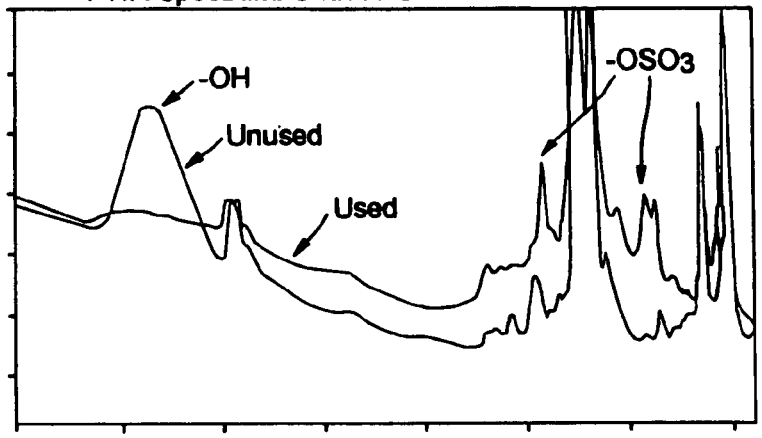
FIG. 7 shows FTIR spectra of used and unused PVA membranes.

The reaction of the sulfuric acid with a crosslinked (with 1,6 diisocyanatohexane) poly(vinyl alcohol) (PVA) membrane was followed with FTIR. The reaction took place by placing the crosslinked PVA membrane into a spent sulfuric acid fluid. The thickness of the original membrane, as determined by SEM (shown in FIG. 12), was approximately 15 microns. The results are shown in the spectra of FIGS. 6 and 7. The spectrum of FIG. 6 shows the absorbance of a teflon membrane support having a nominal pore size of 0.2 microns, while the spectrum of FIG. 7 shows the initial and used Gore-Tex supported PVA membrane, respectively. The spectra show that loss of the alcohol group occurred, which was "replaced" with a sulfate moiety.

Example 3

Figure 8:
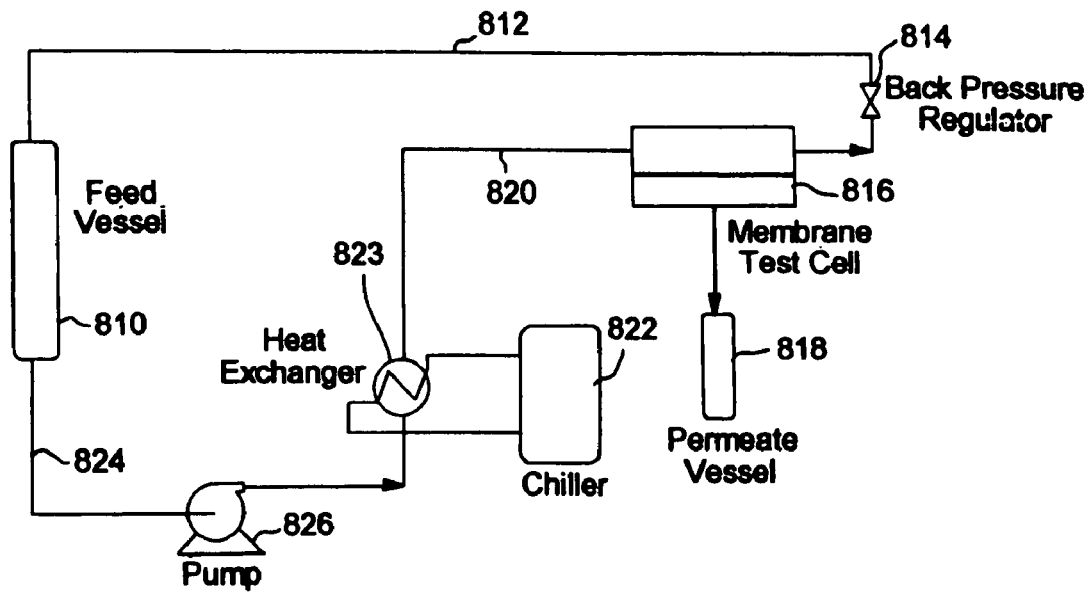
FIG. 8 is a simplified schematic of a membrane testing system.

The schematic of FIG. 8 shows a membrane testing system which was used to evaluate the membranes. In reference to FIG. 8 the conditions used in the evaluation were:

Feed Vessel 810, Volume: 3000 ml

Pump 826, Rate: up to 1 gallon/minute (usually run at 0.63 gallons/minute)

Heat Exchanger 824: 1.5" diameter and 18.75" length, 2.18 ft2 surface area

Membrane 816, Effective Surface Area in Use: 24 in2

Membrane 816, Maximum Operating Pressure Test Cell: 1000 psig

Chiller 822 to Maintain Desired Feed Temperature

Figure 9:
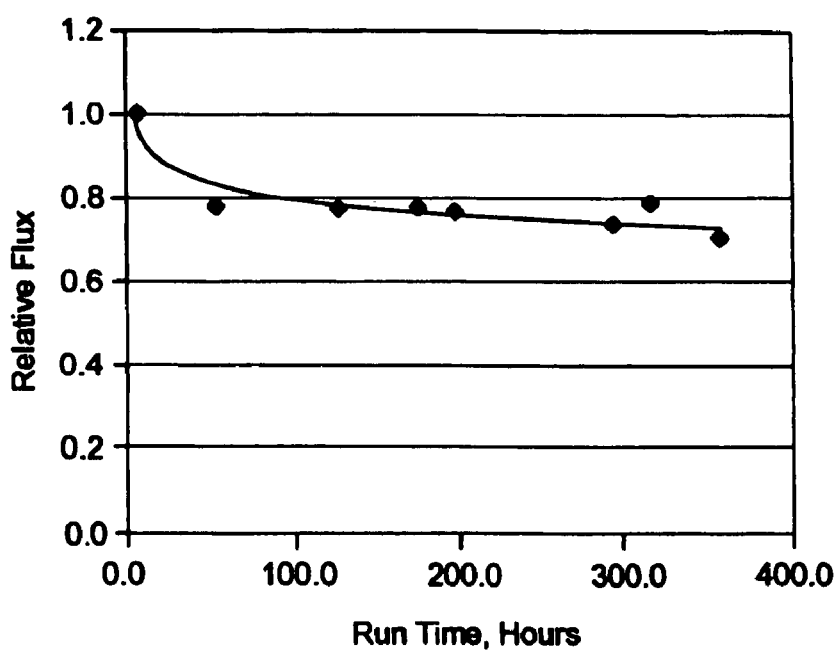
FIG. 9 shows the relative flux of an inventive PVA membrane.
Figure 10:
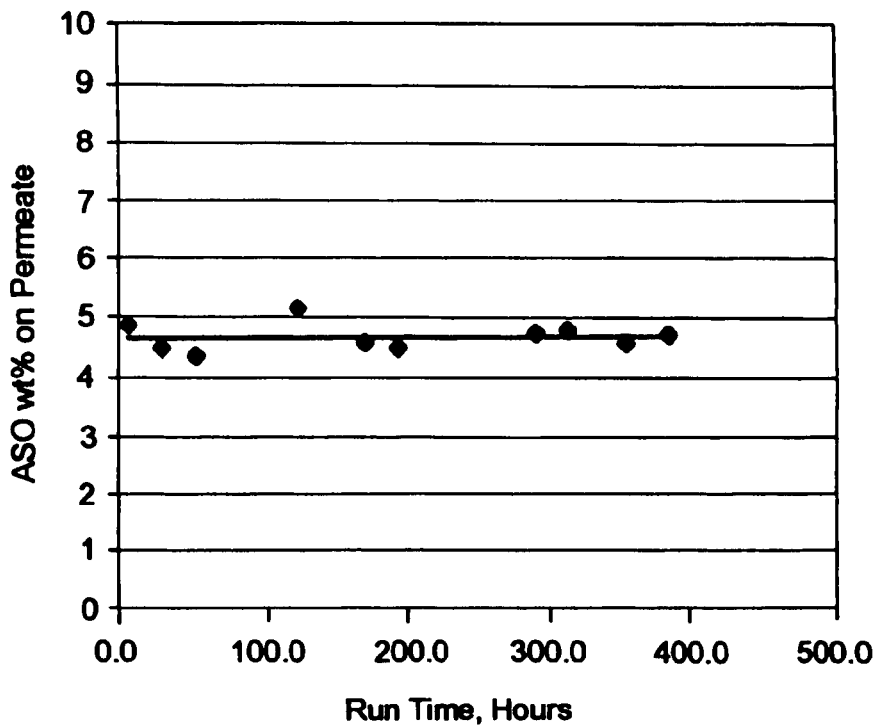
FIG. 10 shows the amount of ASO in wt % in the permeate as a function of run time for an inventive PVA membrane.
Figure 11:
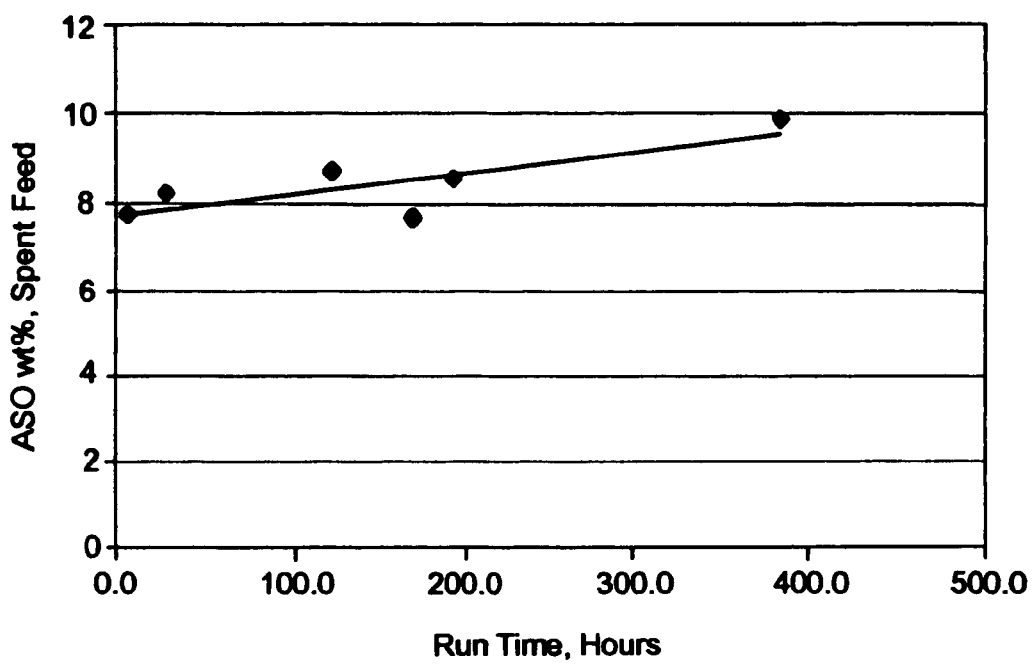
FIG. 11 shows the amount of ASO in wt % in the membrane test cell feed as a function of run time for an inventive PVA membrane.

In operation to maintain a given temperature, heat exchanger 823 is operatively connected to a chiller 822. The spent acid is directed via line 820 to a membrane cell 816. The permeate product which is rich in acid and water is collected in a permeate vessel 818. The retentate rich in hydrocarbons is recycled via back pressure regulator 814 and line 812 to the feed vessel 810. The permeate product and retentate are analyzed for acid, water and hydrocarbon concentration using well known techniques. The results of the measurements at 500 psig feed pressure and 20° C. are presented in FIGS. 9, 10 and 11. FIG. 10 shows the relative flux of the permeate through membrane 816 as a function of time. FIG. 10 shows the ASO concentration in the permeate as a function of time. FIG. 11 shows the ASO concentration in the feed with run time. Thus, comparison of FIGS. 10 and 11 shows that ASO concentration in the permeate is substantially lower than the feed concentration. The data show that after a period of membrane conditioning, the ASO is concentrated in the feed due to the separation by the membrane of sulfuric acid and water from feed stream. The membrane continued to produce permeate containing approximately 50% of feed ASO concentration even over extended periods of time of continuous testing.

Example 4

This example describes formation of a composite membrane structure having 3 polymer layers. A 2.3 wt % polyvinylalcohol (PVA) solution was made in a 50/50 anhydrous mixture of dimethylsulfoxide (DMSO) and dimethylformamide (DMF). The PVA (Aldrich Chemical Co) was 99% hydrolyzed and had a molecular weight between 124-186 Kg/mol. A separate 3.37 wt % anhydrous solution of hexamethyldiisocyanate was prepared in a 50/50 mixture of DMSO/DMF solvent mixture. Both the solutions were chilled to 7° C. These two solutions were mixed at 7° C. in a proportion such that the ratio by weight of hexamethyldiisocyanate to PVA in the final solution was 17%. The final solution was mixed for one minute before coating a 3 mil thick solution layer on top of a 0.1 micron pore size expanded polytetrafluoroethylene (PTFE) layer laminated on a polyolefin microporous support provided by Donaldson Company, Inc. of Minneapolis, Minn. (Item No. AX04-104F). This polyolefin microporous support provides mechanical strength without any significant impact on flux and selectivity provided by the cross-linked membrane. The coated solution layer was air dried at room temperature (25° C.) for 1 minute and next cured in hot air at 118° C. for 40 seconds. It was next cured at 120° C. for 5 minutes before storing for performance testing. The final thickness of the cross-linked PVA membrane was between 1-2 microns.

Example 5

Two membranes similar to the membrane prepared in Example 4 were used to perform separation on a sulfuric acid solution that also contained hydrocarbons. The membranes were prepared by using the above procedure to form a crosslinked PVA membrane on a membrane roll of substrate material comprising microporous PTFE on a polyolefin microporous support. The two membranes were samples taken from different sections of the membrane roll. Table 4 shows the feeds and the corresponding results for acid separations performed with the two membranes. The feed used in the separations shown in Table 4 was spent acid from a refinery alkylation unit. The feed pressure was 800 psig at a feed flow rate of 0.8 gallons per minute. The feed temperature, retentate temperature, and permeate temperature were all 25° C. The permeate was maintained at atmospheric pressure.

TABLE 4

| | Flux | Feed | | | Permeate | | |
|---|---|---|---|---|---|---|---|
| | GFD | Water | Acid | ASO | Water | Acid | ASO |
| Membrane #1 | | | | | | | |
| Sample 1 | 1.57 | 3.06 | 88.20 | 8.74 | 3.66 | 91.66 | 4.68 |
| Sample 2 | 1.30 | 3.13 | 85.37 | 11.50 | 4.02 | 89.89 | 6.09 |
| Sample 3 | 0.77 | 2.94 | 82.46 | 14.59 | 3.77 | 87.62 | 8.61 |
| Membrane #2 | | | | | | | |
| Sample 1 | 1.08 | 2.98 | 87.89 | 9.13 | 3.64 | 91.48 | 4.89 |
| Sample 2 | 0.96 | 3.13 | 85.32 | 11.54 | 4.08 | 89.67 | 6.25 |
| Sample 3 | 0.65 | 3.00 | 82.40 | 14.60 | 3.92 | 87.39 | 8.69 |

As shown in Table 4, the membrane structure selectively allows the acid to pass through, resulting in a permeate with an increased acid content (by weight) and a decreased acid solubilized oil content (by weight). The flux decreases as the amount of hydrocarbon in the feed increases, but the membrane is still effective for performing the separation.

The above preferred embodiments are provided for purposes of illustrating the invention and should not be construed as limiting the scope of the invention as delineated by the following claims.

What is claimed is:

1. A method for recovering sulfuric acid from a feed mixture comprising sulfuric acid, hydrocarbons and water, the method comprising:
    processing said feed mixture that comprises from about 70 to about 98 percent by weight acid, using a crosslinked polymeric membrane comprising a crosslinked polyvinyl alcohol, a crosslinked polyvinyl sulfate, an oxoanion modified crosslinked polymerized polyvinyl alcohol, or a combination thereof, such membrane formed by an anhydrous process, to form a first retentate containing a substantially greater weight percentage of hydrocarbons than said feed mixture and a first permeate product containing a greater weight percentage of acid than said feed mixture, said crosslinked polymeric membrane being selectively permeable to the acid over the hydrocarbons in the feed mixture and further characterized as having a crosslinking density from about 1.0% to about 25.0%, and wherein the crosslinked polymeric membrane is crosslinked utilizing a crosslinking agent selected from the group consisting of 1,4 diisocyanatohexane, 1,4 diisocyanatobutane, 1,8 diisocyanatooctane, 1,12 diisocyanatododecane, 1,5 diisocyanato-2-methyl pentane, and 4,4' diisocyanato-diphenylmethane.

2. The method of claim 1, wherein said polymeric membrane comprises polyvinyl sulfate.

3. The method of claim 1, wherein said feed mixture contains from about 1 to about 20 wt % hydrocarbons, and from about 0.5 to about 7 wt % water.

4. The method of claim 1, wherein the crosslink density is at least 5%, the crosslink density being substantially uniform throughout the crosslinked polymeric membrane.

5. The method of claim 1, wherein the crosslinked polymeric membrane is supported by a second polymeric membrane, the thickness of the crosslinked polymeric membrane being at least twice as great as the pore size of the second polymeric membrane.

6. The method of claim 1, wherein said first retentate contains a weight percentage of hydrocarbons of at least about 3 wt % greater than said feed mixture, and said first permeate contains a weight percentage of acid of at least about 1 wt % greater than said feed mixture.

7. A method for recovering sulfuric acid from a feed mixture comprising sulfuric acid, hydrocarbons, and water, the method comprising:
    processing said feed mixture that comprises from about 70 to about 98 percent by weight acid and about 15 percent or less by weight of water, using a crosslinked polymeric membrane comprising a crosslinked polyvinyl alcohol, a crosslinked polyvinyl sulfate, an oxoanion modified crosslinked polymerized polyvinyl alcohol, or a combination thereof, such membrane formed by an anhydrous process, to form a first retentate containing a substantially greater weight percentage of hydrocarbons than said feed mixture and a first permeate product containing a greater weight percentage of acid than said feed mixture, said crosslinked polymeric membrane being selectively permeable to the acid over the hydrocarbons in the feed mixture and further characterized as having a crosslinking density from about 1.0% to about 25.0, and wherein the crosslinked polymeric membrane is crosslinked utilizing a crosslinking agent selected from the group consisting of 1,4 diisocyanatohexane, 1,4 diisocyanatobutane, 1,8 diisocyanatooctane, 1,12 diisocyanatododecane, 1,5 diisocyanato-2-methyl pentane, and 4,4' diisocyanato-diphenylmethane.

8. The method of claim 7, wherein said polymeric membrane comprises polyvinyl sulfurate.

9. The method of claim 7, wherein said feed mixture contains from about 1 to about 20 wt % hydrocarbons, and from about 0.5 to about 7 wt % water.

10. The method of claim 7, wherein said first retentate contains a weight percentage of hydrocarbons of at least about 3 wt % greater than said feed mixture, and said first permeate has a ratio of acid and water at least 1% greater than said first ratio.

11. The method of claim 7, wherein said first retentate contains a weight percentage of hydrocarbons of at least about 3 wt % greater than said feed mixture, and said first permeate contains a weight percentage of acid of at least about 1 wt % greater than said feed mixture.

* * * * *